United States Patent
Ruiters et al.

(10) Patent No.: US 10,882,506 B2
(45) Date of Patent: Jan. 5, 2021

(54) CONTROLLING A DRIVE SYSTEM FOR AT LEAST ONE AXLE OF A MOTOR VEHICLE

(71) Applicant: GKN Automotive Ltd., Redditch (GB)

(72) Inventors: Volker-René Ruiters, Siegburg (DE); Gerd Kaiser, Lobbach (DE); Rudolf Fitz, Troisdorf (DE); Emanuel Blaj, Bergisch Gladbach (DE); Florian Sontheim, Troisdorf (DE); Enrique Cordero, Cologne (DE); Rainer Bruening, Rheine (DE)

(73) Assignee: GKN Automotive Ltd., Redditch (GB)

( * ) Notice: Subject to any disclaimer, the term of this patent is extended or adjusted under 35 U.S.C. 154(b) by 177 days.

(21) Appl. No.: 16/197,599

(22) Filed: Nov. 21, 2018

(65) Prior Publication Data
US 2019/0161067 A1 May 30, 2019

(30) Foreign Application Priority Data

Nov. 24, 2017 (DE) .......................... 10 2017 127 816

(51) Int. Cl.
| | | |
|---|---|---|
| *B60W 10/02* | (2006.01) | |
| *B60W 10/08* | (2006.01) | |
| *B60K 17/35* | (2006.01) | |
| *B60K 1/00* | (2006.01) | |
| *B60W 30/186* | (2012.01) | |
| *B60W 30/188* | (2012.01) | |
| *B60W 50/00* | (2006.01) | |

(52) U.S. Cl.
CPC .............. *B60W 10/02* (2013.01); *B60K 1/00* (2013.01); *B60K 17/3515* (2013.01); *B60W 10/08* (2013.01); *B60W 30/186* (2013.01); *B60W 30/188* (2013.01); *B60K 2001/001* (2013.01); *B60W 2050/0027* (2013.01); *B60W 2510/0208* (2013.01); *B60W 2510/0241* (2013.01); *B60W 2510/0258* (2013.01); *B60W 2510/0291* (2013.01); *B60W 2510/083* (2013.01); *B60W 2710/021* (2013.01); *B60W 2710/027* (2013.01); *B60W 2710/083* (2013.01); *B60W 2720/30* (2013.01); *B60W 2720/406* (2013.01)

(58) Field of Classification Search
CPC .... B60W 10/02; B60W 10/08; B60W 10/119; B60W 10/16; B60W 30/186; B60W 30/1888; B60W 2510/0275; B60W 2710/083; B60W 2720/406
See application file for complete search history.

(56) References Cited

U.S. PATENT DOCUMENTS

| | | | | |
|---|---|---|---|---|
| 6,105,703 | A * | 8/2000 | Kuroda ................. | B60K 17/35 180/248 |
| 2012/0024614 | A1* | 2/2012 | Sigmund ............ | B60K 23/0808 180/248 |
| 2016/0039284 | A1* | 2/2016 | Osborn ................... | F16H 48/22 180/245 |
| 2018/0345787 | A1* | 12/2018 | Niimi ..................... | F16D 25/10 |

* cited by examiner

*Primary Examiner* — Edwin A Young
(74) *Attorney, Agent, or Firm* — Bejin Bieneman PLC

(57) ABSTRACT

A method controls a drive system for an axle of a motor vehicle, wherein the drive system has at least an electrical machine as drive unit, a drive shaft which is driven by the drive unit, a first output shaft and a second output shaft and also a first clutch which connects the drive shaft to the first output shaft and a second clutch which connects the drive shaft to the second output shaft.

16 Claims, 1 Drawing Sheet

CONTROLLING A DRIVE SYSTEM FOR AT LEAST ONE AXLE OF A MOTOR VEHICLE

CROSS-REFERENCE TO RELATED APPLICATIONS

This application claims priority to German Application No. DE 10 2017 127 816.8, filed on Nov. 4, 2017, which application is hereby incorporated herein by reference in its entirety.

BACKGROUND AND SUMMARY

The present disclosure relates to a method for controlling a drive system for at least one axle and preferably for precisely one axle of a motor vehicle. The drive system comprises at least an electrical machine as drive unit, a drive shaft which is driven by the drive unit, a first output shaft and a second output shaft and also a first clutch which connects the drive shaft to the first output shaft and a second clutch which connects the drive shaft to the second output shaft. A control unit for controlling the drive unit and the clutches is further provided. The clutches are associated with the output shafts of different axles or preferably a common axle.

Drive systems of this kind are provided, for example, for passing on and, in accordance with demands, splitting torque provided by the drive unit.

There is a constant need to control drive systems as far as possible such that rapid adjustment to varying driving situations and changing operating points is rendered possible. In this case, thermal or mechanical overloading of the components of the drive system and a resulting possibly premature failure of the components should be avoided.

To at least partially eliminate/solve the disadvantages and problems discussed above, a method for controlling a drive system (during operation of a motor vehicle) suitable for this purpose is disclosed. In particular, the method should allow components of the drive system to be protected against overloading, wherein transmission and splitting of a drive torque, which is desired by a driver of the motor vehicle for example, via the clutches to the wheels of at least one axle, is rendered possible as rapidly and precisely as possible.

The features disclosed and claimed herein can be combined with one another in any desired technologically meaningful way and can be supplemented by explanatory facts from the description and details from the figures, with further design variants of the disclosure being highlighted.

The disclosure proposes a method for controlling a drive system for at least one axle of a motor vehicle. The drive system comprises at least
  an electrical machine as drive unit,
  a drive shaft which is driven by the drive unit,
  a first output shaft and a second output shaft,
  a first clutch which connects the drive shaft to the first output shaft,
  a second clutch which connects the drive shaft to the second output shaft, and
  a control unit for controlling the drive unit and the clutches.

The method for controlling a drive system for at least one axle of a motor vehicle exhibits at least the following steps:
  a) ascertaining an (estimated) first torque which can be transmitted as a maximum to the first output shaft (at the current operating point) via the first clutch and ascertaining an (estimated) second torque which can be transmitted as a maximum to the second output shaft (at the current operating point) via the second clutch;
  b) limiting a drive torque, which can be provided by the drive unit for driving the first output shaft and the second output shaft, depending on a sum of the first torque and the second torque.

The method can additionally exhibit at least the following steps which (immediately and/or with a time delay) follow step b):
  c) determining a desired drive torque which exceeds the drive torque which can be provided, and
  d) operating the drive unit with at most the drive torque which can be provided.

The above (non-limiting) subdivision of the method steps into a) to d) is intended to serve primarily only for descriptive purposes and not to dictate any order and/or dependence. The frequency of the method steps, for example during the setting-up and/or the operation of the drive system, can also vary. Similarly, it is possible for method steps to at least partially overlap in respect of time and/or for individual method steps or several method steps to be repeated.

The control method relates, in particular, to controlling the clutches of the drive system, so that the clutches can be operated at prespecified time points or even at any time by a contact-pressure force and therefore a torque which is provided by the drive unit can be transmitted in a desired manner to the wheels of at least one, preferably common, axle of the motor vehicle.

In particular, the method is provided for controlling a drive system in which two clutches are provided on a common axle of the motor vehicle, wherein in each case one wheel of the motor vehicle is connected in a torque-transmitting manner to the drive unit of the motor vehicle via each of the two clutches. The two clutches can replace the differential which is otherwise customary and by way of which different rotation speeds of the wheels can be compensated for. The clutches can be, for example, hydraulically or electromechanically operable clutches.

The design of clutches and drive systems of this kind can be described as follows: The clutches used can be, for example, multi-plate clutches in which outer plates are connected in a rotationally fixed manner to an external plate carrier and inner plates are connected in a rotationally fixed manner to an internal plate carrier and each plate carrier is connected in a rotationally fixed manner to the drive shaft or the respective output shaft. As a result of application of a contact-pressure force (as a result of the operating pressure) which acts in an axial direction, the plates, in the case of other clutches the friction partners or precisely those partners respectively for generating a frictional connection between torque-transmitting parts of the respective clutch, are brought into contact with one another, so that a torque can be transmitted from the drive shaft, via the clutch, to the respective output shaft.

Specifically in the case of drive systems with an electrical machine as drive unit, it may be the case (for example at low rotation speeds and possibly a simultaneously high provided drive torque) that a drive torque which is provided by the drive unit is at least temporarily greater than a torque which can be transmitted as a maximum by the clutches (at an existing operating point) in total (that is to say the sum of the first torque and the second torque). In this driving situation or at this operating point, that is to say when the drive torque which is provided by the drive unit is greater than the sum of the first torque and the second torque, the electrical machine or the drive shaft accelerates more rapidly than the motor vehicle or the output shafts. This creates slip on at least one clutch, which slip leads to high frictional power in the clutches (at least one clutch). The resulting thermal loading can destroy or at least damage a clutch. Furthermore, the efficiency of the drive system is reduced and the $CO_2$ balance is adversely affected in this way.

In principle, a small slip (a so-called microslip) can be entirely permissible and also intended. This is permitted, in particular, because it is possible to determine in this way that the desired torque is transmitted via the clutches with the intended distribution (that is to say predetermined proportions of the torque to each wheel of the motor vehicle). However, the thermal loading by the microslip does not lead to impermissible thermal loading of the clutches.

In particular, the microslip amounts to a rotation speed difference between the drive shaft and an output shaft of more than 0 (zero) revolutions per minute. In particular, the microslip amounts to a rotation speed difference of between 1 and 10 revolutions per minute, preferably less than 5 revolutions per minute.

Operating points of this kind are present, for example, when the motor vehicle is driving around a bend and the wheels of a common axle should be at different speeds. Here, a torque which is transmitted via the clutch on the inside of the bend is reduced in order to improve a yaw behaviour of the motor vehicle.

Owing to the proposed method, a drive torque which can be provided by the drive unit for driving the first output shaft and the second output shaft can be limited depending on a sum of the first torque and the second torque. In particular, the drive torque which is provided by the drive unit can correspond at most to the sum of the first torque and the second torque. A higher drive torque would not accelerate the motor vehicle, but rather only increase the slip in at least one of the clutches—this is reduced or even avoided here.

If, therefore, a desired drive torque is requested for example by a driver of the motor vehicle (or by the control unit) (the drive unit should therefore provide this desired drive torque as drive torque) and in particular an existing drive torque is changed, it is determined according to step c) whether this desired drive torque exceeds the drive torque which can be provided. According to step b), the drive torque which can be provided by means of the drive unit is, in particular, already limited, so that according to step d) the drive unit generates only the drive torque which can be provided and provides the drive torque for the clutches to pass on to the wheels.

The method, and in particular only step a), is carried out, in particular, continuously or exclusively (and then continuously or at least periodically) at specific operating points of the drive unit or in specific driving situations.

Accordingly, continuously means, herein, that the method is always and constantly initiated or carried out independently of specifiable operating points or driving situations.

According to another refinement of the disclosure, the method is carried out exclusively (and then continuously or at least periodically (at prespecified time points)) at specific operating points of the drive unit or in specific driving situations. In particular, a period is determined depending on at least one of the following parameters: the time, the operating period of the drive system, the more or less intensive loading of the drive system. A period can amount to a fraction of a second, at least one second at least 5 seconds. The period can be variable, in particular depending on the loading of the drive system or of the clutches.

According to step a), the first torque which can be transmitted as a maximum to the first output shaft via the first clutch and the second torque which can be transmitted as a maximum to the second output shaft via the second clutch are ascertained. The further steps b) and also c) and d) are carried out, in particular, only when the sum of the first torque and the second torque exceeds a limit value (for example 75% of a rated torque of the drive unit).

In particular, while a desired drive torque exceeds the drive torque which can be provided and, according to step d), the desired drive torque is limited to at most the drive torque which can be provided, the desired drive torque is taken into account when controlling the clutches. Taking into account the desired drive torque in this way is performed, in particular, such that at least one response time of at least one clutch to a desired change in state is shortened or that a clutch slip in an acceleration phase is reduced.

The control unit operates the drive system, in particular, such that any possibility of passing on the desired drive torque to the wheels via the clutches is realized as quickly as possible. In particular, the drive torque which can be provided is increased to the desired drive torque as quickly as possible, wherein, during this increase, the specifications in respect of the suppression of a slip or in respect of maintaining a microslip are taken into account.

In particular, steps a) to d) are further carried out continuously until the drive torque which is provided reaches the (currently) desired drive torque.

In step a), at least one (preferably all) of the following parameters can be checked and taken into account:
  a temperature of at least in each case one component (for example a cooling fluid or lubricating fluid, a friction plate, a housing etc.) of the first clutch and of the second clutch;
  a contact-pressure force which is present in each case for generating a frictional connection between torque-transmitting parts of the first clutch and of the second clutch;
  a first rotation speed difference between the drive shaft and the first output shaft and a second rotation speed difference between the drive shaft and the second output shaft;
  a frictional power in the first clutch and in the second clutch.

In particular, in each case one wheel of a common axle of the motor vehicle can be connected in a torque-transmitting manner to the drive unit by way of operating each clutch.

In particular, a gearbox with a variable transmission ratio is arranged between the drive unit and the output shafts. Variable transmission ratio means, in particular, that there is not a single constant transmission ratio, but rather that the transmission ratio can be changed, for example in steps or else continuously.

As an alternative, there can be no gearbox or a gearbox with a single fixed transmission ratio arranged between the drive unit and the output shafts.

At least one of the two clutches can be a hydraulically operated clutch, preferably both clutches being hydraulically operated clutches. In the case of a hydraulically operated clutch, the contact pressure is transmitted to the clutch via a hydraulic fluid. The hydraulic fluid can be pressurized by means of a (likewise electrically operable) pump.

At least one of the two clutches can be an electrically or electromechanically operated clutch, preferably both clutches being electrically electromechanically operated clutches. In the case of an electrically operated clutch, the contact pressure is generated directly by a further electrical machine, for example by a ramp arrangement which can be rotated by means of the machine.

In particular, in each case one wheel of the common axle of the motor vehicle can be connected in a torque-transmitting manner to the drive unit as a result of operating each of the clutches.

At least one clutch is, in particular both clutches are, preferably a multiplate clutch.

The disclosure further proposes a motor vehicle, at least having a drive system for at least one axle of the motor vehicle. The drive system comprises at least an electrical machine as drive unit,
a drive shaft which is driven by the drive unit,
a first output shaft and a second output shaft and also
a first clutch which connects the drive shaft to the first output shaft and
a second clutch which connects the drive shaft to the second output shaft and furthermore
a control unit for controlling the drive unit and the clutches, wherein the control unit is set up and designed for carrying out the proposed method and, respectively, carries out the method during operation of the motor vehicle.

The statements relating to the method apply, in particular, to the motor vehicle too, and vice versa.

In particular, the two clutches for transmitting torques are arranged on one axle of a motor vehicle, so that a first wheel of one axle is connected in a torque-transmitting manner to the drive unit by operating the first clutch and a second wheel of the same axle of the motor vehicle is connected in a torque-transmitting manner to the drive unit by operating the second clutch. Therefore, in particular, the clutches are not a clutch of a motor vehicle which clutch is arranged between the drive unit and a shiftable gearbox of the motor vehicle.

Clutches of this kind which are jointly arranged on one axle (often) have to process sudden changes in a first torque and pass on this torque to the wheels in a predetermined manner By way of precaution, it should be noted that the numerals ("first", "second", . . . ) used here serve primarily (only) to distinguish between multiple objects, values or processes of the same type, that is to say do not in particular necessarily prespecify a dependence and/or order of these objects, values or processes in relation to one another. If a dependence and/or order is necessary, this is specified explicitly here or becomes clearly apparent to a person skilled in the art on examination of the specifically described refinement.

SUMMARY OF THE DRAWINGS

The invention as well as the technical field are explained in more detail below with reference to the figures. It should be noted that the invention is not intended to be restricted by the exemplary embodiments shown. In particular, unless explicitly stated otherwise, it is also possible to extract partial aspects of the substantive matter explained in the figures and combine it with other constituent parts and findings from the present description and/or figures. Identical reference symbols denote identical objects, with the result that, where appropriate, explanations from other figures can be used in a supplementary fashion. In the drawings, in each case schematically.

DESCRIPTION

Figure 1:
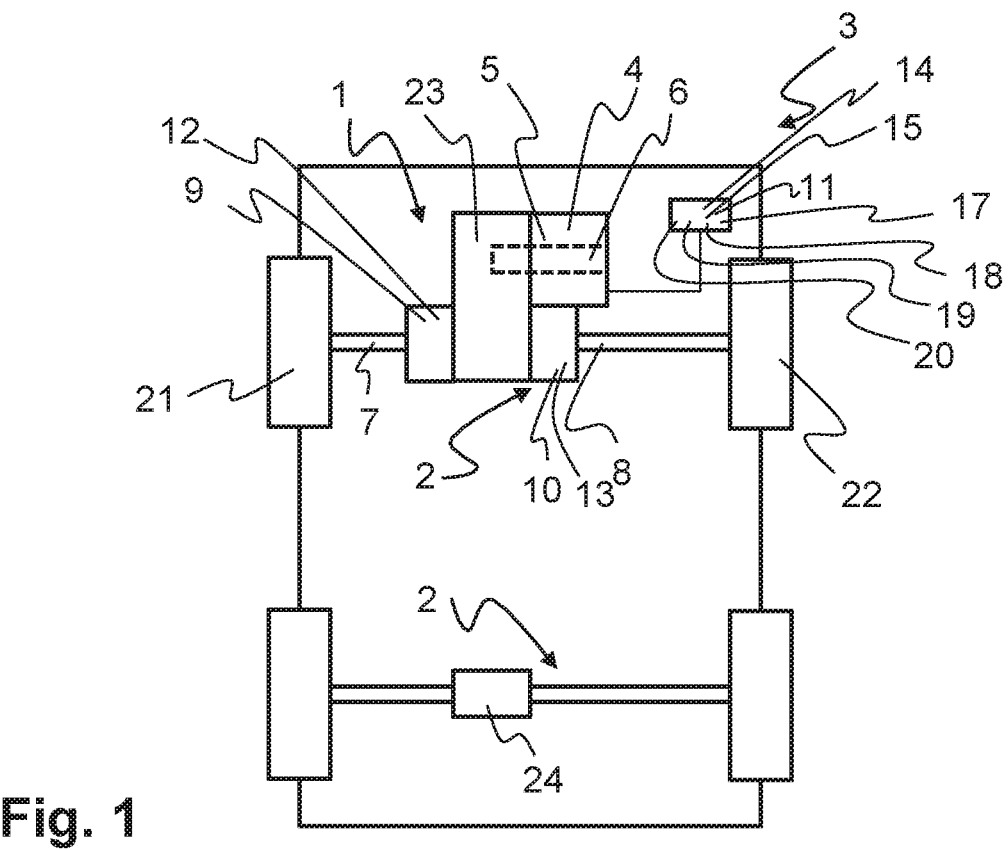
FIG. 1: shows a motor vehicle comprising a drive system for driving in each case one wheel of the motor vehicle.

FIG. 1 shows a motor vehicle 3 comprising a drive system 1 for driving in each case a first wheel 21 and a second wheel 22 of a common axle 2 of the motor vehicle 3. The drive system 1 comprises an electrical machine 4 as drive unit 5, a drive shaft 6 which is driven by the drive unit 5, a first output shaft 7 and a second output shaft 8, and also a first clutch 9 which connects the drive shaft 6 to the first output shaft 7 and a second clutch 10 which connects the drive shaft 6 to the second output shaft 8. A control unit 11 for controlling the drive unit 15 and the two clutches 9, 10 is further provided.

FIG. 1 shows a drive system 1 in which two clutches 9, 10 are provided on a common axle 2 of the motor vehicle 3, wherein in each case one wheel 21, 22 of the motor vehicle 3 is connected in a torque-transmitting manner to the drive unit 5 of the motor vehicle 3 by means of each of the two clutches 9, 10. The two clutches 9, 10 replace a differential 24 which is otherwise customary (shown on the other axle 2 of the motor vehicle 3 here) and by way of which the different rotation speeds of the wheels arranged there can be compensated for.

A gearbox 23 with a variable transmission ratio is arranged between the drive unit 5 and the output shafts 7, 8.

Owing to the proposed method, a drive torque which can be provided by the drive unit 5 for driving the first output shaft 7 and the second output shaft 8 should be limited depending on a sum of the first torque 12 and the second torque 13. In this case, the drive torque which is provided by the drive unit 5 should correspond at most to the sum of the first torque 12 and the second torque 13.

If, therefore, a desired drive torque 15 is requested, for example, by a driver of the motor vehicle 3 (the drive unit 5 should therefore provide this desired drive torque 15 as drive torque), it is determined according to step c) whether this desired drive torque 15 exceeds the drive torque 14 which can be provided. According to step b), the drive torque 14 which can be provided by means of the drive unit 5 is already limited, so that according to step d) the drive unit 5 generates only the drive torque 14 which can be provided and provides the drive torque for the clutches 9, 10 to pass on to the wheels 21, 22.

According to step a), the first torque 12 which can be transmitted as a maximum to the first output shaft 7 via the first clutch 9 and the second torque 13 which can be transmitted as a maximum to the second output shaft 8 via the second clutch 10 are ascertained.

In step a), the following parameters can be checked and taken into account: a temperature 17 of at least in each case one component of the first clutch 9 and of the second clutch 10, a contact-pressure force 18 which is present in each case for generating a frictional connection between torque-transmitting parts of the first clutch 9 and of the second clutch 10, a first rotation speed difference 19 between the drive shaft 6 and the first output shaft 7 and a second rotation speed difference 20 between the drive shaft 6 and the second output shaft 8, a frictional power in the first clutch 9 and in the second clutch 10.

Figure 2:
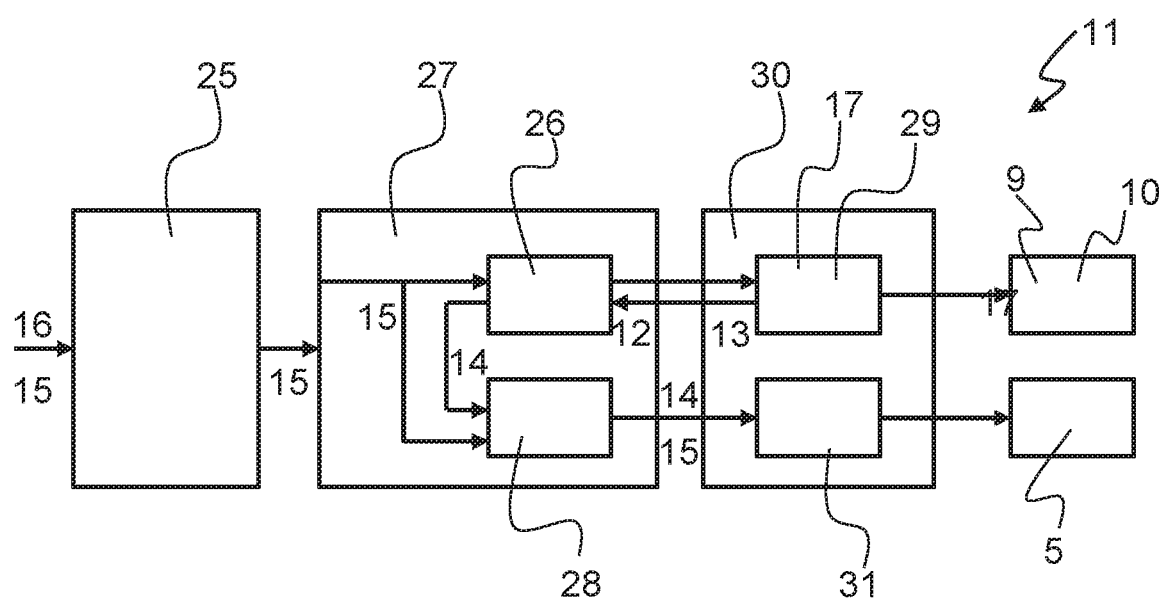
FIG. 2: shows a sequence of a method for controlling a drive system.

FIG. 2 shows a sequence of a method for controlling a drive system 1. As part of a change in state 16 (for example change in an operating point or in a driving situation), a desired drive torque 15 is ascertained by a first module 25 of the control unit 11 and passed on to a first submodule 26 and a second submodule 28 of the second module 27. The input signals for the further modules 27, 30 are conditioned in the first module 25.

In a first submodule 26 of a second module 27, driving-dynamics specifications for the clutches 9, 10 are calculated and passed on to a third submodule 29 of a third module 30. The third submodule 29 calculates that contact-pressure force 18 of the respective clutch 9, 10 which is required for transmitting the requested torques and passes on these control commands to the clutches 9, 10. At the same time, the third submodule 29 estimates or calculates the torques which can currently be transmitted for each clutch 9, 10 at the current operating point and forms the sum torque which can be provided (in the case of the maximum first torque 12 and the maximum second torque 13, this sum torque is the drive torque 14 which can be provided) 14. This sum torque is passed on to a second submodule 28 of the second module 27 by means of the first submodule 26 of the second module 27. In the second submodule, the desired drive torque 15 is compared with the drive torque 14 which can be provided and either the desired drive torque 15 (if it is lower than or equal to the drive torque 14 which can be provided) or the drive torque 14 which can be provided (if the desired drive torque 15 is greater than the drive torque 14 which can be provided) is passed on to a fourth submodule 31 of the third module 30.

The fourth submodule 31 controls the contactors of the machine 4 and therefore controls the drive unit 15.

While a desired drive torque 15 exceeds the drive torque 14 which can be provided and, according to step d), the desired drive torque 15 is limited to at most the drive torque 14 which can be provided, the desired drive torque 15 is also taken into account when controlling the clutches 9, 10. Taking into account the desired drive torque 15 in this way is performed by way of at least one response time of at least one clutch 9, 10 to the change in state 16 being shortened or a clutch slip in an acceleration phase being reduced.

The control unit 11 then operates the drive system 1 such that any possibility of passing on the desired drive torque 15 to the wheels 21, 22 via the clutches 9, 10 is used as quickly as possible.

The above-mentioned parameters (temperature 17, contact-pressure force 18, rotation speed differences 19, 20 and frictional powers; only temperature 17 being shown here) can be checked and taken into account in the third submodule 29 of the third module 30.

LIST OF REFERENCE SYMBOLS

1 Drive system
2 Axle
3 Motor vehicle
4 Machine
5 Drive unit
6 Drive shaft
7 First output shaft
8 Second output shaft
9 First clutch
10 Second clutch
11 Control unit
12 First torque
13 Second torque
14 Drive torque which can be provided
15 Desired drive torque
16 Change in state
17 Temperature
18 Contact-pressure force
19 First rotation speed difference
20 Second rotation speed difference
21 First wheel
22 Second wheel
23 Gearbox
24 Differential
25 First module
26 First submodule
27 Second module
28 Second submodule
29 Third submodule
30 Third module
31 Fourth submodule

The invention claimed is:

1. A method for controlling a drive system for at least one axle of a motor vehicle, wherein the drive system has at least an electrical machine as a drive unit, a drive shaft which is driven by the drive unit, a first output shaft and a second output shaft and also a first clutch which connects the drive shaft to the first output shaft and a second clutch which connects the drive shaft to the second output shaft, and a control unit for controlling the drive unit and the clutches, wherein the method comprises:
    a) ascertaining a first torque that can be transmitted as a maximum to the first output shaft via the first clutch and ascertaining a second torque that can be transmitted as a maximum to the second output shaft via the second clutch; and
    b) limiting a drive torque, that can be provided by the drive unit for driving the first output shaft and the second output shaft, depending on a sum of the first torque and the second torque.

2. The method of claim 1, further comprising, following step b):
    c) determining a desired drive torque which exceeds the drive torque that can be provided, and
    d) operating the drive unit with at most the drive torque that can be provided.

3. The method of claim 2, wherein, while the desired drive torque exceeds the drive torque that can be provided and, in step d), the desired drive torque is limited to at most the drive torque that can be provided, the desired drive torque is taken into account when controlling the clutches by way of at least one response time of at least one clutch to a desired change in state being shortened, or a clutch slip in an acceleration phase being reduced.

4. The method of claim 1, wherein, in step a), at least one of the following parameters is checked and taken into account:
    a temperature of at least in each case one component of the first clutch and of the second clutch;
    a contact-pressure force which is present in each case for generating a frictional connection between torque-transmitting parts of the first clutch and of the second clutch;
    a first rotation speed difference between the drive shaft and the first output shaft and a second rotation speed difference between the drive shaft and the second output shaft;
    a frictional power in the first clutch and in the second clutch.

5. The method of claim 1, wherein the motor vehicle includes a first wheel and a second wheel of a common axle of the motor vehicle can be connected in a torque-transmitting manner to the drive unit by operating each clutch.

6. The method of claim 1, wherein the motor vehicle includes a gearbox with a variable transmission ratio is arranged between the drive unit and the output shafts.

7. A control unit for a motor vehicle, the motor vehicle at least having a drive system for at least one axle of the motor vehicle, wherein the drive system has at least an electrical machine as a drive unit, a drive shaft which is driven by the drive unit, a first output shaft and a second output shaft and also a first clutch which connects the drive shaft to the first output shaft and a second clutch which connects the drive shaft to the second output shaft, and the control unit arranged for controlling the drive unit and the clutches, wherein the control unit is configured to carry out steps comprising;
   a) ascertaining a first torque that can be transmitted as a maximum to the first output shaft via the first clutch and ascertaining a second torque that can be transmitted as a maximum to the second output shaft via the second clutch; and
   b) limiting a drive torque, that can be provided by the drive unit for driving the first output shaft and the second output shaft, depending on a sum of the first torque and the second torque.

8. The control unit of claim 7, further configured to carry out steps, following step b), of:
   c) determining a desired drive torque which exceeds the drive torque that can be provided, and
   d) operating the drive unit with at most the drive torque that can be provided.

9. The control unit of claim 8, wherein, while the desired drive torque exceeds the drive torque that can be provided and, in step d), the desired drive torque is limited to at most the drive torque that can be provided, the desired drive torque is taken into account when controlling the clutches by way of at least one response time of at least one clutch to a desired change in state being shortened, or a clutch slip in an acceleration phase being reduced.

10. The control unit of claim 7, wherein, in step a), at least one of the following parameters is checked and taken into account:
   a temperature of at least in each case one component of the first clutch and of the second clutch;
   a contact-pressure force which is present in each case for generating a frictional connection between torque-transmitting parts of the first clutch and of the second clutch;
   a first rotation speed difference between the drive shaft and the first output shaft and a second rotation speed difference between the drive shaft and the second output shaft;
   a frictional power in the first clutch and in the second clutch.

11. A motor vehicle, comprising
   a drive system for at least one axle of the motor vehicle, wherein the drive system has at least an electrical machine as a drive unit, a drive shaft which is driven by the drive unit, a first output shaft and a second output shaft and also a first clutch which connects the drive shaft to the first output shaft and a second clutch which connects the drive shaft to the second output shaft, and
   a control unit arranged for controlling the drive unit and the clutches, wherein the control unit is configured to carry out steps comprising;
   a) ascertaining a first torque that can be transmitted as a maximum to the first output shaft via the first clutch and ascertaining a second torque that can be transmitted as a maximum to the second output shaft via the second clutch; and
   b) limiting a drive torque, that can be provided by the drive unit for driving the first output shaft and the second output shaft, depending on a sum of the first torque and the second torque.

12. The motor vehicle of claim 11, wherein the control unit is further configured to carry out steps, following step b), of:
   c) determining a desired drive torque which exceeds the drive torque that can be provided, and
   d) operating the drive unit with at most the drive torque that can be provided.

13. The motor vehicle of claim 12, wherein, while the desired drive torque exceeds the drive torque that can be provided and, in step d), the desired drive torque is limited to at most the drive torque that can be provided, the desired drive torque is taken into account when controlling the clutches by way of at least one response time of at least one clutch to a desired change in state being shortened, or a clutch slip in an acceleration phase being reduced.

14. The motor vehicle of claim 11, wherein the control unit is further configured so that, in step a), at least one of the following parameters is checked and taken into account:
   a temperature of at least in each case one component of the first clutch and of the second clutch;
   a contact-pressure force which is present in each case for generating a frictional connection between torque-transmitting parts of the first clutch and of the second clutch;
   a first rotation speed difference between the drive shaft and the first output shaft and a second rotation speed difference between the drive shaft and the second output shaft;
   a frictional power in the first clutch and in the second clutch.

15. The motor vehicle of claim 11, wherein a first wheel and a second wheel of a common axle of the motor vehicle can be connected in a torque-transmitting manner to the drive unit by operating each clutch.

16. The motor vehicle of claim 11, wherein a gearbox with a variable transmission ratio is arranged between the drive unit and the output shafts.

* * * * *